(12) United States Patent
Reykowski et al.

(10) Patent No.: US 11,277,808 B2
(45) Date of Patent: Mar. 15, 2022

(54) SYSTEM AND METHOD FOR CLOCK RECOVERY IN WIRELESS COMMUNICATIONS

(71) Applicant: KONINKLIJKE PHILIPS N.V., Eindhoven (NL)

(72) Inventors: Arne Reykowski, Newberry, FL (US); Paul Franz Redder, Newberry, FL (US); Rodrigo Calderon Rico, Gainesville, FL (US)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 16/960,329

(22) PCT Filed: Jan. 8, 2019

(86) PCT No.: PCT/EP2019/050290
§ 371 (c)(1),
(2) Date: Jul. 7, 2020

(87) PCT Pub. No.: WO2019/137889
PCT Pub. Date: Jul. 18, 2019

(65) Prior Publication Data
US 2020/0344706 A1 Oct. 29, 2020

Related U.S. Application Data

(60) Provisional application No. 62/616,524, filed on Jan. 12, 2018.

(51) Int. Cl.
*H04W 56/00* (2009.01)

(52) U.S. Cl.
CPC ................................ *H04W 56/004* (2013.01)

(58) Field of Classification Search
CPC .... H04W 56/004; H04W 56/00; A61B 5/055; H04L 27/00; H04L 7/00
See application file for complete search history.

(56) References Cited

U.S. PATENT DOCUMENTS

| | | | |
|---|---|---|---|
| 7,020,111 B2 * | 3/2006 | Ozluturk | H04L 27/206 370/335 |
| 7,123,009 B1 | 10/2006 | Scott | |

(Continued)

FOREIGN PATENT DOCUMENTS

JP   02119320 A   5/1990

OTHER PUBLICATIONS

International Search Report and Written Opinion from PCT/EP2019/050290 dated Apr. 5, 2019.

*Primary Examiner* — Nathan S Taylor

(57) ABSTRACT

A base station operating with a system clock includes a transmitter, a receiver, a phase error detector and a controller. The transmitter sends a first RF signal modulated onto a first RF carrier having a first phase over a first channel having a first variable phase delay to a mobile station. The mobile station recovers the first RF carrier, generates a second RF carrier, and synchronizes a local clock using the recovered first RF carrier and/or the second RF carrier. The receiver receives a second RF signal modulated onto the second RF carrier having a second phase over a second channel having a second variable phase delay. The phase error detector determines a phase error signal based on the first and second phases, and the controller generates a control signal based on the phase error signal. The control signal is applied to first and second inverse channel models.

20 Claims, 6 Drawing Sheets

(56) References Cited

U.S. PATENT DOCUMENTS

| | | | |
|---|---|---|---|
| 10,302,716 B2 | 5/2019 | Reykowski | |
| 2002/0008558 A1* | 1/2002 | Okuda | H03K 5/133 |
| | | | 327/175 |
| 2005/0017773 A1* | 1/2005 | Adan | H03L 7/0891 |
| | | | 327/156 |
| 2009/0322335 A1* | 12/2009 | Adachi | G01R 33/3692 |
| | | | 324/318 |
| 2011/0227574 A1* | 9/2011 | Akita | G01R 33/3692 |
| | | | 324/322 |
| 2012/0286787 A1* | 11/2012 | Van Liere | G01R 33/3621 |
| | | | 324/322 |
| 2013/0342199 A1* | 12/2013 | Bollenbeck | G01R 33/3692 |
| | | | 324/307 |
| 2014/0314191 A1* | 10/2014 | Yang | H04L 7/0008 |
| | | | 375/371 |
| 2015/0180647 A1* | 6/2015 | Kwon | H04L 7/0091 |
| | | | 370/350 |
| 2015/0312078 A1 | 10/2015 | Bogdan | |
| 2015/0351067 A1 | 12/2015 | Taylor et al. | |
| 2017/0293006 A1* | 10/2017 | Soejima | G01R 33/4616 |
| 2018/0376441 A1* | 12/2018 | Reykowski | H04W 56/0085 |

\* cited by examiner

SYSTEM AND METHOD FOR CLOCK RECOVERY IN WIRELESS COMMUNICATIONS

CROSS REFERENCE TO RELATED APPLICATIONS

This application is a U.S. national phase application of International Application No. PCT/EP2019/050290 filed on Jan. 8, 2019, which claims the benefit of U.S. Application Ser. No. 62/616,524 filed on Jan. 12, 2018 and is incorporated herein by reference.

TECHNICAL FIELD

The present system and method generally relate to a magnetic resonance imaging (MRI) system with a wireless-type radio-frequency (RF) coil portion and a method of operating the same. More particularly, the present system and method relate to reducing or eliminating phase delay in round-trip signals between a base station and a mobile station.

BACKGROUND

A magnetic Resonance Imaging (MRI) system provides an imaging method that generally uses frequency and phase encoding of protons for image reconstruction of image(s) of a subject. An MRI system may use a wireless RF coil(s) to sense magnetic resonance signal emitted from the subject under MRI examination. In particular, the wireless RF coil acquires analog MR information during an acquisition period, and then an associated RF coil unit converts the analog MR information to form digitized information, such as digitized raw data (k-space) information. Thereafter, a corresponding wireless RF station (which may be referred to generally as "mobile station") wirelessly communicates the digitized information to a radio unit (which may be referred to generally as "base station") in a main unit of the MRI system, separate from the mobile wireless RF station. The base station provides the digitized information to a system controller in the main unit of the MRI system for further processing and/or display.

The mobile station relies upon an internal clock for correct synchronization with a system clock (e.g., a master clock) of the MRI system. However, because of the wireless nature of wireless RF coils and induced RF jitter and phase drift, for example, it is often difficult to accurately synchronize the mobile station internal clock with the MRI system clock using conventional wireless communication methods. For example, there may be a varying time delay in a Line-Of-Sight (LOS) path, a LOS path with blockage, and/or a non-LOS path between the mobile station and the base station, tied to the system clock, which may be caused by motion between transmitter and receiver and/or changes in the channel model. This time-varying time delay can cause drift between the internal clock of the mobile station and the MRI system clock.

When the internal clock of the mobile station is not accurately synchronized with the MRI system clock, phase noise of the mobile station internal clock can cause image artifacts in reconstructed images due to the nature of an encoding method being used, particularly during long acquisitions. For example, it can be shown that if it is required that the clock-induced root-mean-square (RMS) phase error in raw image data remain below 1 degree, then the RMS time jitter should be controlled to remain less than 44 picoseconds (ps) at 64 MHz and less than 22 ps at 128 MHz.

Also, sampling clocks in an MRI system are used to generate and sample the various analog signals that are needed to produce an MRI image. These sampling clocks have to be synchronized with each other to very high accuracy. In the case of the RF sampling clocks, the current digital receiver specification requires that the maximum drift of these clocks is less than 22 ps. In terms of speed of light, 22 ps is the time it takes for light to travel 7 mm. In the case of wireless digital receivers for MRI coils (e.g., the RF coil unit), the sampling clocks inside such receivers will have to be synchronized to the rest of the system by means of a wireless synchronization signal. There are several challenges associated with the transmission of a wireless synchronization signal. One challenge, for example, is temporal variations in the propagation delay for the wireless clock synchronization signal. These temporal variations may be caused by motion of a subject table, a subject on the subject table, and/or operating personal inside the MRI room.

FIG. 6 is a simplified functional block diagram of a base station and a mobile station of conventional wireless communication system, e.g., of an MRI system. Referring to FIG. 6, a base station 610 includes a base transceiver 615 with corresponding transmit and receive antennae 616 and 617, and a mobile station 620 includes a mobile transceiver 625 with corresponding receive and transmit antennae 627 and 626. The base transceiver 615 transmits a first signal $S_1(t)$ (e.g., a wireless synchronization signal received from a baseband processor), modulated onto a first carrier with a first frequency $f_1$, through a first (uplink) channel CH1 to the mobile transceiver 625. The first channel CH1 has variable phase delay $\Delta\varphi_1$. The mobile transceiver 625 receives the phase delayed first signal $S_1(t)\ e^{j\times\varphi_1}$ by locking onto and recovering the incoming first carrier. The first carrier is used by the mobile station 620 to generate a second carrier with a second frequency $f_2$. The mobile transceiver 625 modulates a second signal $S_2(t)\cdot e^{j\times\varphi_1}$ onto the second carrier and transmits the second signal $S_{2\ (t)}\cdot e^{j\Delta\varphi_1}$ through a second (downlink) channel CH2 with variable phase delay $\Delta\varphi_2$. The second carrier is recovered at the base transceiver 215 to receive the phase delayed second signal $S_2(t)\cdot e^{j(\Delta\varphi_1+\Delta\varphi_2)}$. The resultant carrier phase may be compared to the phase of the first signal $S_1$, so the total round-trip phase delay may be determined. However, the values of the first and second variable phase delays $\Delta\varphi_1$ and $\Delta\varphi_2$ are not known individually, and continue to influence signal transmission. This makes accurate synchronization of the system clock with the internal clock and/or sampling clocks of the mobile station 620 using a wireless synchronization signal difficult.

Accordingly, it would be desirable to provide a system and method of wireless communication between a base station and a mobile station, e.g., for an MRI system that overcomes the problem of variations in channel propagation delay and its deteriorating effect on the clock synchronization using wireless synchronization signals.

SUMMARY

According to an aspect of the disclosure, a base station operating with a system clock, the base station includes a transmitter, a receiver, a phase error detector and a controller. The transmitter is configured to send a first radio frequency (RF) signal modulated onto a first RF carrier over a first channel to a mobile station, the first RF carrier having a first phase and the first channel having a first variable phase delay ($\Delta\varphi_1$). The mobile station receives the first RF signal, recovers the first RF carrier, generates a second RF carrier using the recovered first RF carrier, and synchronizes a local clock using at least one of the recovered first RF carrier and the second RF carrier. The receiver is configured to receive a second RF signal modulated onto the second RF carrier over a second channel from the mobile station, the second RF carrier having a second phase and the second channel having a second variable phase delay ($\Delta\varphi_2$). The phase error detector is configured to determine a phase error signal based on a difference between the first phase and the second phase. The controller is programmed to generate a control signal ($\mu$) based on the phase error signal, to apply the control signal to a first inverse channel model having a first function ($\Delta\varphi_3(\mu)$) that approximates an inverse of the first phase delay ($-\Delta\varphi_1$), and to a second inverse channel model having a second function ($\Delta\varphi_4(\mu)$ that approximates an inverse of the second phase delay ($-\Delta\varphi_2$). The approximated inverse of the first phase delay is applied to a subsequent first RF signal sent by the transmitter over the first channel to the mobile station, thereby reducing the first variable phase delay of the first channel and the clock phase error at the mobile station resulting from the first variable phase delay.

According to another aspect of the disclosure, a method is provided for performing clock synchronization between a system clock of a base station and a local clock of a mobile station remote from the base station. The method includes transmitting a first RF signal modulated on a first RF carrier over a first channel to the mobile station, the first RF signal having a first phase and the first channel having a first variable phase delay. The mobile station recovers the first RF carrier, generates a second RF carrier using the recovered first RF carrier, and synchronizes the local clock using at least one of the recovered first RF carrier and the second RF carrier. The method further includes receiving a second RF signal modulated on the second RF carrier over a second channel from the mobile station, the second RF signal having a second phase and the second channel having a second variable phase delay; determining a phase error signal based on a phase difference between the first phase and the second phase; generating a control signal based on the phase error signal; approximating an inverse of the first phase delay by applying the control signal to a first phase shifter; and shifting the first phase of a subsequent first RF signal by the inverse of the first phase delay using the first phase shifter, thereby reducing the first variable phase delay and the phase error signal resulting from the first variable phase delay.

According to another aspect of the disclosure, a wireless communication system includes a base station and a mobile station The base station operates with a system clock, and includes a transmitter configured to transmit a first RF signal modulated onto a first RF carrier over a first channel, the first RF carrier having a first phase and the first channel having a first variable phase delay; a receiver configured to receive a second RF signal modulated onto a second RF carrier over a second channel, the second RF carrier having a second phase and the second channel having a second variable phase delay; a phase error detector configured to determine a phase error signal based on a difference between the first phase and the second phase; and a controller. The mobile station operates with a local clock, and includes a receiver configured to receive the first RF signal modulated onto the first RF carrier over the first second channel; a phase locked loop (PLL) configured to recover the first RF carrier, to generate the second RF carrier using the recovered first RF carrier, and to synchronize the local clock to the system clock using at least one of the recovered first RF carrier and the second RF carrier; and a transmitter configured to transmit the second RF signal modulated onto the second RF carrier over a second channel, the second RF carrier having a second phase and the second channel having a second variable phase delay. The controller is programmed to generate a control signal based on the phase error signal; and apply the control signal to a first inverse channel model having a first function that approximates an inverse of the first phase delay, and to a second inverse channel model having a second function that approximates an inverse of the second phase delay. The approximated inverse of the first phase delay is applied to a subsequent first RF signal sent by the transmitter over the first channel to the mobile station, thereby reducing the first variable phase delay of the first channel and the clock phase error at the mobile station resulting from the first variable phase delay.

BRIEF DESCRIPTION OF THE DRAWINGS

The present invention will be more readily understood from the detailed description of exemplary embodiments presented below considered in conjunction with the accompanying drawings. In the drawings, like numerals represent the same or similar elements.

DETAILED DESCRIPTION

Figure 1:
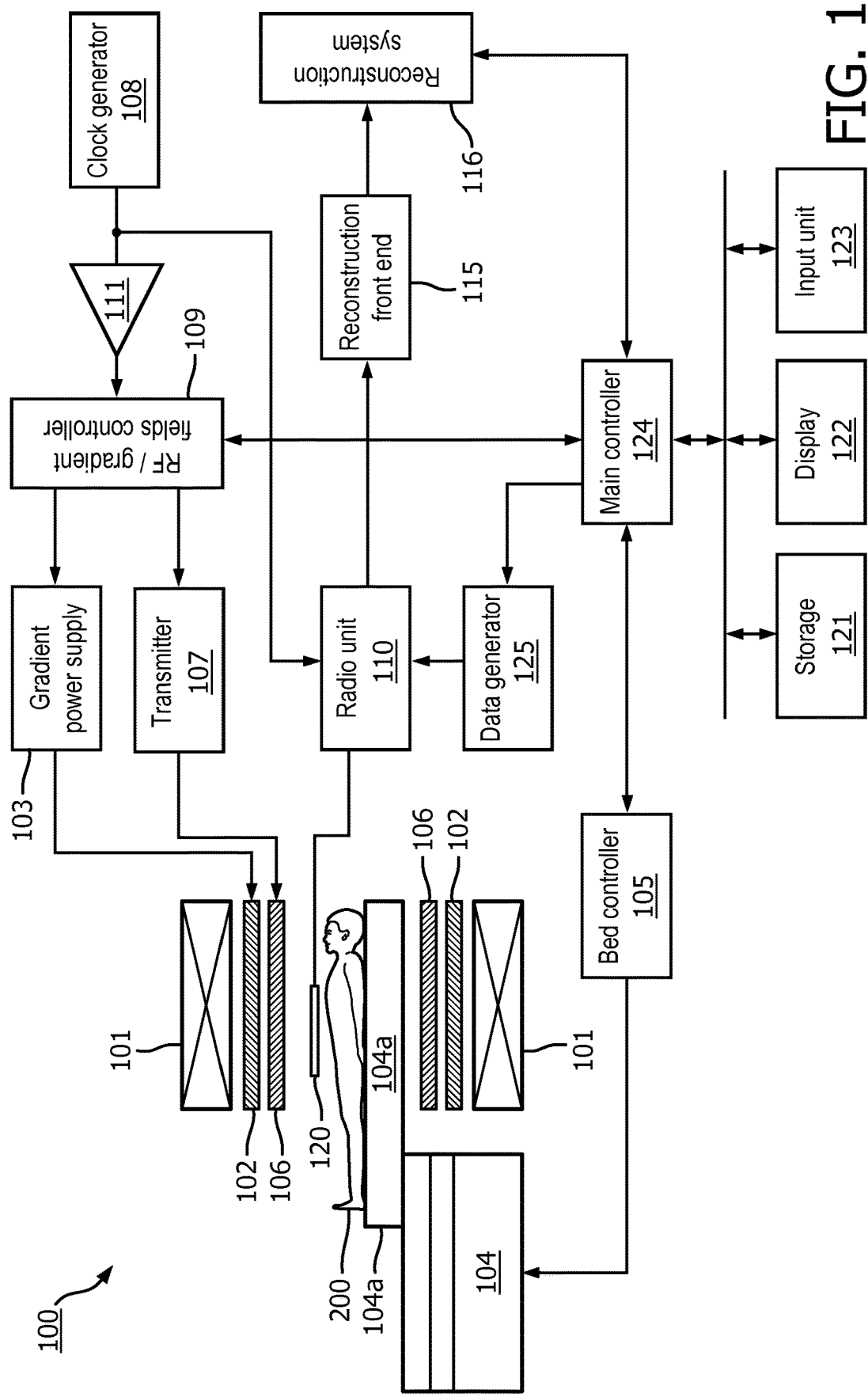
FIG. 1 is a simplified block diagram of an illustrative magnetic resonance imaging (MRI) system, including a wireless communication system, according to a representative embodiment.

The present invention will now be described more fully hereinafter with reference to the accompanying drawings, in which embodiments of the present invention are shown. The present invention may, however, be embodied in different forms and should not be construed as limited to the embodiments set forth herein. Rather, these embodiments are provided as teaching examples.

According to various embodiments, a carrier phase tracking loop is improved by adding inverse channel models to uplink and downlink channels (first and second channels) between a base station (first station) and mobile station (second station) that communicate wirelessly with one another over the uplink and downlink channels. Generally, each of the uplink and downlink channels has a corresponding variable channel delay affecting the phase of signals phasing through the channels. The equivalent inverse channel models compensate for the variable channel delays, respectively, by applying the same phase delays with opposite polarities. When the inverse channel models are properly adjusted, the resultant phase error of the recovered clock can be minimized or eliminated.

The embodiments do not require exchanging messages between the base station and the mobile station, and the mobile station may be a simple coherent transceiver operating in either frequency division duplex (FDD) or time division duplex (TDD) mode. It should be understood that the disclosed embodiments will be described in terms of medical instruments; however, the teachings of the present invention are much broader and are applicable to any wireless communication systems or methods involving uplink and downlink communications over different channels requiring synchronized clocks.

Reference in the specification to "one embodiment" or "an embodiment," as well as other variations thereof, means that a particular feature, structure, characteristic, step and so forth described in connection with the embodiment is included in at least one embodiment of the present teachings. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

It will also be understood that when an element such as a layer, region or material is referred to as being "on" or "over" another element, it can be directly on the other element or intervening elements may be present. In contrast, when an element is referred to as being "directly on" or "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

FIG. 1 is a simplified block diagram of an illustrative MRI system, including wireless communication stations, according to a representative embodiment.

Referring to FIG. 1, MRI system 100 includes a static magnet 101, a gradient coil 102, a gradient power supply 103, a subject (patient) table (bed) 104, a table (bed) controller 105, an RF coil unit 106, wireless RF station (mobile station) 120, a transmitter 107, a clock generator 108, an RF/gradient fields controller 109, a driver 111, a radio unit (base station) 110, a reconstruction front end 115, a reconstruction system 116, storage 121, a display 122, an input unit 123, a main controller 124 and a data generator 125.

In various embodiments, the components other than wireless RF station 120 are included in a main unit separate from the wireless RF station 120. The main unit may be divided into a gantry and a processing system. In this case, for example, the static magnet 101, the gradient coil 102, the gradient power supply 103, the table 104, the table controller 105, the RF coil unit 106, the transmitter 107, the RF/gradient fields controller 109 and the radio unit 110 may be provided in the gantry, while the clock generator 108, the driver 111, the reconstruction front end 115, the reconstruction system 116, the storage 121, the display 122, the input unit 123 and the main controller 124 may be provided in the processing system.

Figure 2:
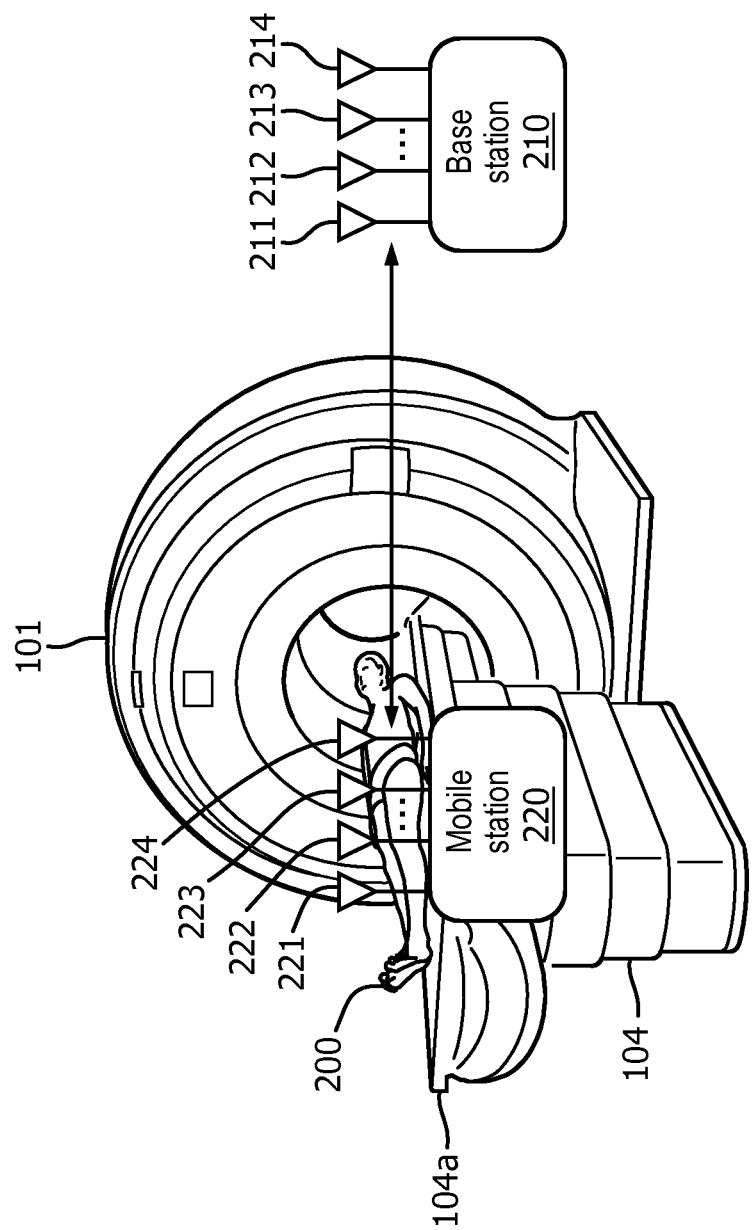
FIG. 2 is a simplified schematic diagram of a base station and a mobile station in a wireless communication system of an MRI system, according to a representative embodiment.

The static magnet 101 has a hollow cylindrical shape, as shown in FIG. 2, for example, and generates a uniform static magnetic field in its internal space. For instance, the static magnet 101 may include a permanent magnet or superconducting magnet.

The gradient coil 102 has a hollow cylindrical shape, and is disposed inside the static magnet 101. The gradient coil 102 may include a combination of three kinds of coils corresponding to X, Y, Z axes which are orthogonal to one another. The gradient coil 102 generates a gradient magnetic field having its intensity inclined along the X, Y, Z axes when the three kinds of coils are separately supplied with currents from gradient power supply 103. In addition, the Z axis is in the same direction as, for example, the direction of the static magnetic field. The gradient magnetic fields of the X, Y, and Z axes correspond to, for example, a slice selecting gradient magnetic field Gs, a phase encoding gradient magnetic field Ge and a read-out gradient magnetic field Gr, respectively. The slice selecting gradient magnetic field Gs is used to determine a given imaging section. The phase encoding gradient magnetic field Ge is used to change the phase of a magnetic resonance signal in accordance with a spatial position. The read-out gradient magnetic field Gr is used to change the frequency of the magnetic resonance signal in accordance with the spatial position.

A subject 200 is inserted into an internal space (imaging space) of the gradient coil 102 while on a top board 104a of the table 104. The table 104 moves the top board 104a in its longitudinal direction (right-and-left direction in FIG. 1) and vertical direction under the control of the table controller 105. Normally, the table 104 is installed so that this longitudinal direction is parallel with the central axis of the static field magnet 101.

The RF coil unit 106 includes one or more coils contained in a cylindrical case. The RF coil unit 106 is disposed inside the gradient magnetic field coil 102. The RF coil unit 106 is supplied with a high-frequency pulse (RF pulse) from the transmitter 107 to generate a high-frequency magnetic field.

The wireless RF station 120 may be mounted on the top board 104a, embedded in top board 104a, or attached to or otherwise in contact with the subject 200. At the time of imaging, the wireless RF station 120 is inserted into the imaging space together with subject 200, and receives or senses the magnetic resonance signal emitted from the subject 200 as electromagnetic waves, and in response thereto produces digital data representing the sensed magnetic resonance signal. The wireless RF station 120 may include or be attached to one, two or more receiving RF coil units which may include any kind of coils for sensing the magnetic resonance signal emitted from the subject 200. The wireless RF station 120 includes a function of wirelessly transmitting as an electric signal (e.g., a digital signal), the digital data of the digital signal representing the magnetic resonance signal received from subject 200.

The transmitter 107 supplies the RF coil unit 106 with the RF pulse, which corresponds to a Larmor frequency, for example.

The clock generator 108 generates a first clock signal having a predetermined frequency. This first clock signal may be used as a system clock serving as a timing reference for overall operation of the MRI system 100.

The RF/gradient fields controller 109 changes the gradient magnetic fields in accordance with a required pulse sequence under control of the main controller 124. The RF/gradient fields controller 109 also controls the gradient power supply 103 and the transmitter 107 for transmitting the RF pulse. In addition, RF/gradient fields controller 109 is provided with the first clock signal after the level of the first clock signal has been properly adjusted by driver 111. The RF/gradient fields controller 109 carries out the pulse sequence synchronously with the first clock signal.

The radio unit 110 receives the magnetic resonance signal digitally and wirelessly transmitted from the wireless RF station 120. The radio unit 110 digitally demodulates the received digital magnetic resonance signal, and then outputs the demodulated signal to reconstruction front end 115. The radio unit 110 also modulates a data signal output by the data generator 125 onto a carrier, and wirelessly transmits the modulated digital signal to the wireless RF station 120. In addition, the radio unit 110 modulates the first clock signal received from the clock generator 108 onto a carrier, and wirelessly transmits the modulated first clock signal to the wireless RF station 120. The wireless RF station 120 recovers the first clock signal, which may be used as a wireless synchronization signal for synchronizing an internal clock (not shown) of the wireless RF station 120 with the system clock provided by the clock generator 108. In an embodiment, a feedback loop is established between the wireless RF station 120 and the radio unit 110 to minimize or eliminate phase error of the recovered first clock signal.

The reconstruction front end 115 subjects the magnetic resonance signal provided from radio unit 110 to gain control, frequency conversion and quadrature detection. The reconstruction front end 115 further decompresses the amplitude of the magnetic resonance signal compressed in wireless RF station 120. The reconstruction system 116 reconstructs an image of subject 200 on the basis of at least one of the magnetic resonance signals processed in the reconstruction front end 115.

The storage 121 stores various kinds of data, such as image data indicating the image reconstructed in reconstruction system 116. The display 122 displays the image reconstructed in the reconstruction system 116 and/or various kinds of information including various kinds of operation screens for a user to operate the MRI system 100, under the control of main controller 124. Any convenient display device, such as a liquid crystal display, can be used as the display 122.

The input unit 123 accepts various commands and information inputs from the user of the MRI system 100. The input unit 123 may include a pointing device, such as a mouse or a track ball, a selecting device, such as a mode changeover switch, and/or an input device, such as a keyboard or a touch screen.

The main controller 124 has a central processing unit (CPU) and/or other processor, a memory, etc., that are not shown, and controls functionality of the whole MRI system 100. The data generator 125 generates a data signal for communication with the RF station 120 via the radio unit 110, under the control of the main controller 124. The general operation of an MRI system or apparatus is well known and therefore will not be repeated here.

The wireless RF station 120 relies upon its internal clock (not shown) for correct synchronization with clock generator 108 of the MRI system 100, mentioned above. However, because of the wireless nature of wireless RF coils and induced RF noise, as well as variable phase delay across wireless communication channels, it is often difficult to accurately synchronize the internal clock with the system clock provided by the clock generator 108 using conventional wireless communication methods.

FIG. 2 is a simplified schematic diagram of a base station and a mobile station in wireless communication with one another, according to a representative embodiment. Referring to FIG. 2, in various embodiments, mobile station 220 substantially corresponds to the wireless RF station 120, and base station 210 substantially corresponds to the radio unit 110 of FIG. 1.

The mobile station 220 includes one or more antennae, indicated by representative antennae 211, 212, 213 and 214, for receiving and/or transmitting clock signals for synchronization of the internal clock (not shown) of the mobile station 220 with the system clock of the main unit of the MRI system 100 (e.g., generated by the clock generator 108). The representative antennae 211, 212, 213 and 214 may also be used for transmitting digital data representing the sensed magnetic resonance signal in accordance with the synchronized clocks. As shown, the mobile station 220 may be mounted on the top board 104a of the table 104, embedded in the top board 104a, or attached to or otherwise in contact with the subject 200. The base station 210 likewise includes one or more antennae, indicated by representative antennae 211, 212, 213 and 214, for transmitting and/or receiving the synchronization clock signals in a feedback loop to assure clock synchronization. The representative antennae 211, 212, 213 and 214 may also be used for receiving digital data representing the magnetic resonance signals from the mobile station 220 in accordance with the synchronized clocks.

MRI systems are required to maintain an ecosystem that can coexist in a medical facility that is stable and well controlled to function properly and not interfere with other electromagnetic devices. This is due to the highly sensitive nature of the weak subject signal and strong MRI transmitter. These requirements create the need for MRI systems to be located within a restricted and confined RF shielded room. The MRI location and ecosystem necessitates specific and unusual conditions for wireless communication. A wireless communication protocol should maintain a high level service of quality within an environment with unpredictable MRI conditions that consist of high power spurious emissions, dense multipath channel condition with large variation of signal propagation over position, frequency and time without impacting the MRI signal or signal-to-noise ratio (SNR).

To address one or more of these issues, in some embodiments the base station 210 may communicate with the mobile station 220 according to a communication protocol which is compliant with a standard for ultra-wideband (UWB) communications. UWB communications present a specific illustrative case, in which a short pulse (e.g., less than a few nanoseconds) phase shift keying (PSK) modulated signal is spread over a wide spectrum. This short pulse UWB technology may also be referred to as direct sequence UWB (DS-UWB) or impulse radio UWB (IR-UWB). Unlike traditional narrowband technology (Bluetooth, WiFi, etc) or orthogonal frequency-division multiplexing UWB (OFDM-UWB) which are greatly affected by signal propagation conditions, pulse UWB thrives in multipath environments such as might be found in the MRI room 201. Here it is understood that UWB means a transmission with a bandwidth of greater than 500 MHz for a given power emission mask, which for short pulse PSK UWB means that the energy per bit (Eb) has a spread factor equal to the channel bandwidth greater than 500 MHz. Because the Eb is spread over the entire UWB channel, there is a zero mean fading. The short pulse also benefits from the timing of the reflected path delay being greater than the transmission period. The probability density function for short pulse UWB channels can be greater than free-space performance in a multipath environment. The spread factor and emission limits also mean that short pulse UWB has a low probability to interference and interception, which is required to coexist in an environment where strong MRI frequency and harmonic spurs are generated. The UWB standard allows for transmissions in a frequency range from 3.1 GHz to 10.6 GHz, which allows the exact frequencies which are employed to be selected to avoid heavily congested spectrum like the 2.4 GHz and 5.8 GHz, for example.

Figure 3:
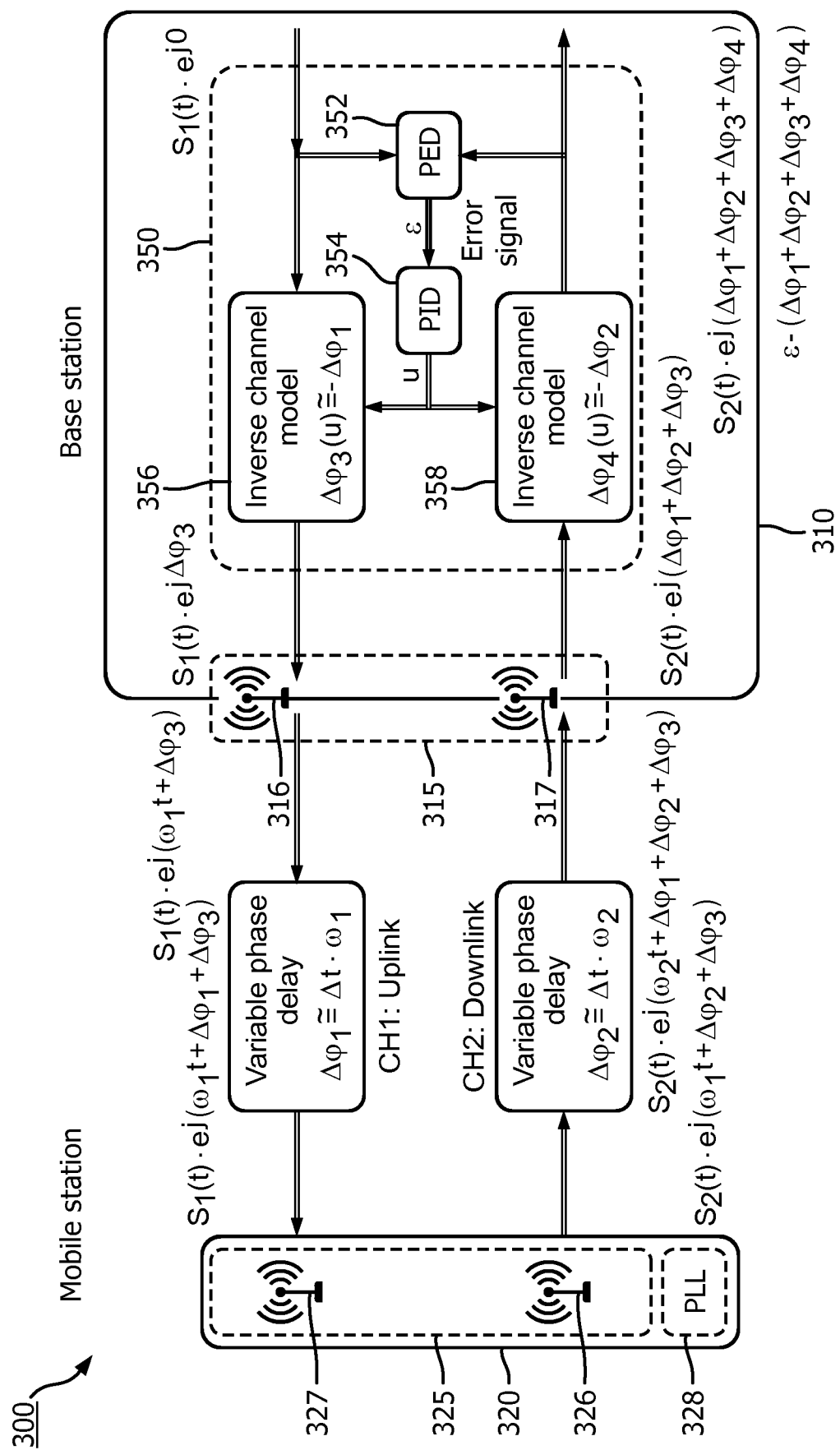
FIG. 3 is a functional block diagram illustrating phase synchronization of clocks in a wireless communication system, according to a representative embodiment.

FIG. 3 is a functional block diagram illustrating phase synchronization of clocks in a wireless communication system, according to a representative embodiment. The wireless communication system 300 includes a base station 310 and mobile station 320, which may correspond to the base station 110, 210 and the mobile station 120, 220 of FIGS. 1 and 2 in an MRI system environment, for example. However, the synchronization teachings are not limited to MRI applications, and may be used for any system requiring high clock synchronization accuracy (e.g., +/−22 ps or better) and/or high range measurement accuracy (e.g., 7 mm or better) between base and mobile stations, such as in wireless telecommunications. The base station 310 and mobile station 320 communicate via a wireless first (uplink) channel CH1 and a wireless second (downlink) channel CH2, from the perspective of the base station 310. As shown in FIG. 3, the system (and corresponding process) for synchronizing clocks incorporates a feedback loop involving sending and receiving synchronization signals over the first and second channels CH1 and CH2 to reduce and/or eliminate phase delay introduced by the first and second channels CH1 and CH2 through incremental detection and correction of phase error.

Referring to FIG. 3, the base station 310 includes a base transceiver 315 with corresponding transmit and receive antennae 316 and 317 for sending and receiving RF signals, respectively, and the mobile station 320 includes a mobile transceiver 325 with corresponding receive and transmit antennae 327 and 326 for receiving and sending RF signals, respectively. In alternative configurations, one or both of the base transceiver 315 and the mobile transceiver 325 may be implemented using a separate transmitter and a separate receiver, without departing from the scope of the present teachings. Likewise, although two antennae are shown at each of the base transceiver 315 and the mobile transceiver 325, it is understood that the signals may be transmitted and received using a single antenna at the base transceiver 315 and/or the mobile transceiver 325, without departing from the scope of the present teachings.

The base station 310 also includes a processing unit 350, which includes a phase error detector (PED) 352, a proportional, integral and derivative controller (PID) 354, a first (output) inverse channel model (ICM) 356, and a second (input) ICM 358, described below. Generally, the processing unit 350 may be implemented by a digital signal processor (DSP), a computer processor, one or more field-programmable gate arrays (FPGAs), one or more application specific integrated circuits (ASICs), or combinations thereof, using software, firmware, hard-wired logic circuits, or combinations thereof. A computer processor, in particular, may consist of any combination of hardware, firmware or software architectures, and may include memory (e.g., volatile and/or nonvolatile memory) for storing executable software/firmware executable code that allows it to perform the various functions. In an embodiment, the computer processor may comprise a central processing unit (CPU), for example, executing an operating system.

In various embodiments, the processing unit 350 may be located within the base station 310, a PC, a dedicated workstation, an external controller of an imaging system, such as the main controller 124 of MRI system 100, or various combinations thereof, without departing from the scope of the present teachings. The processing unit 350 may include a storage device (not shown), such as random access memory (RAM), read-only memory (ROM), flash memory, electrically programmable ROM (EPROM), electrically erasable programmable ROM (EEPROM), hard disk drive (HDD), or the like. A user input/output interface (not shown) may be included with the processing unit 350 for a user to control operations, such as programming and frequency tuning, for example. Each of the PED 352, the PID 354, the first ICM 356, and the second ICM 358 may be implemented as software executable by the processing unit 350 and/or logic performed by one or more FPGAs and/or ASICs, without departing from the scope of the present teachings.

It is understood that the base transceiver 315 and the mobile transceiver 325 further include additional known components for enabling wireless radio frequency (RF) communications, which will not be described in detail herein for the sake of brevity. For example, each of the base transceiver 315 and the mobile transceiver 325 may have a local oscillator (LO) for generating a LO signal with an LO frequency. The LO signal may be mixed with a baseband signal to upconvert the baseband signal received from a baseband processor (not shown) to an RF signal for wireless transmission at an RF frequency. Or, the LO signal may be mixed with a received RF signal to downconvert the RF signal to a baseband signal provided to the baseband processor for wireless reception. Other illustrative components include power amplifiers, low noise amplifiers and filters, as would be apparent to one of ordinary skill in the art.

Generally, the base transceiver 315 of the base station 310 sends a first RF signal, which may be a clock synchronization signal, modulated onto a first RF carrier having first frequency $f_1$ over a first channel CH1 to the mobile transceiver 325 of the mobile station 320. The clock synchronization signal may comprise a predetermined message that may include a training sequence, such as Barker code or other such training sequence, for example, for synchronizing to the message (e.g., identifying a start of the message, finding right symbol polarity and synchronizing onto a symbol). The first channel CH1 has a known first variable phase delay ($\Delta\varphi1$), which depends at least in part on the frequency of the first RF carrier and the physical distance between the base station 310 and the mobile station 320.

The mobile station 320 receives the modulated first RF signal, and recovers the first RF carrier using a phase locked loop (PLL). For example, recovering the first RF carrier may include more specifically recovering the base band frequency and phase offset of the first RF carrier. The mobile station 320 may include two local clocks (not shown). A first local clock is used by the mobile transceiver 325 to generate baseband and RF signals, and a second local clock is used by MRI receivers for MRI coils (e.g., the RF coil unit) to sample MRI data. It is the second local clock that is to be synchronized to the base station clock, according to the various embodiments discussed herein. More particularly, the second local clock synchronized to the system clock drives the analog-to-digital converters (ADCs) in the MRI receivers, which are used to sample the MRI signal and to convert the sampled MRI signal from analog to digital. The first local clock may be generated from the first RF carrier, but does not have to be. This is advantageous to the extent that the first local clock does not have to be synchronized; it just has to have low enough drift so that it does not change during one signal round trip. Because the first RF carrier frequency/phase offset is extracted during receive and reapplied during transmit, as discussed below, the second local clock on the mobile station 320 has no impact on the round trip signal. Notably, reference below to simply the "local clock" on the mobile station 320, including in the claims, refers to the second local clock.

The local clock on the mobile station 320 may be generated from the first RF carrier once the loop is phase locked. Alternatively, synchronizing the local clock may include, for example, comparing the phase of the recovered first RF carrier to a local reference signal which is synchronous with the local clock, and adjusting the phase of the local reference signal accordingly. The recovered first RF carrier is divided down and "cleaned" with a jitter cleaner, provided by the PLL, which disciplines a local oscillator of the mobile station 320 with the incoming first RF carrier, and suppresses a large part of the jitter that comes with the incoming first RF carrier. The local reference signal in turn is used to generate a carrier for the respective transmit signal. The PLL also performs frequency translation of the recovered first RF carrier from the first frequency $f_1$ to a second frequency $f_2$ of a second RF carrier. The jitter cleaner may also perform at least part of this frequency translation. Alternatively, a frequency divider may be used in place of a PLL, although the frequency divider has less functionality, such as lack of jitter cleaning.

The recovered first RF carrier has a phase error resulting from the first variable phase delay ($\Delta\varphi 1$) introduced by the first channel CH1. The mobile transceiver 325 of the mobile station 320 generates the second RF carrier, and a second RF signal, which may be essentially the same as the first RF signal, is modulated onto the second RF carrier at the second frequency $f_2$, although the second RF signal does not need to be the same as the first RF signal. That is, each of the first RF signal and the second RF signal contains a message, as mentioned above. In various embodiments, the message sent from the mobile station 320 may be the same or different from the message received from the base station 310. The second RF carrier is sent over the second channel CH2 to the base transceiver 315. The second channel CH2 has a second variable phase delay ($\Delta\varphi 2$). The base station 310 receives the modulated second RF signal, and recovers the second RF carrier. The base station 310 also detects phase error ($\varepsilon$) incurred during the round-trip between the base station 310 and the mobile station 320, and corrects for the phase error ($\varepsilon$). The round-trip is repeated as a feedback loop using the phase error correction to adjust the phase of the first RF carrier in each subsequent transmission, such that the phase error ($\varepsilon$) is substantially reduced or eliminated over a number of loops.

More particularly, the processing unit 350 receives an input signal $S_1(t) \cdot e^{j0}$, which is input to the first ICM 356. The input signal may be a clock synchronization signal for synchronizing a local clock (not shown) of the mobile station 320 with a system clock (e.g., from clock generator 108 in FIG. 1) used by the base station 310. The clock synchronization is done via tracking the first and second RF carriers. As discussed above, the input signal $S_1(t)$ (first RF signal) contains message(s), which includes a training sequence and may optionally be used for additional communication between base station 310 and the mobile station 310. For example, the base station 10 may communicate to the mobile station 320 when the loop has locked and the phase error is minimized. This informs the mobile station 320 that the recovered clock (recovered first RF carrier) is ready to be used for data acquisition. The mobile station 320 may likewise send useful information to the base station 310 via the second RF signal. For example, the mobile station 320 may send carrier tracking information, such as instantaneous frequency and phase offset with respect to the local clock of the mobile station 220. This information has diagnostic value. For example, in a stable wireless communication system 300, the instantaneous frequency and the phase offset of the recovered carrier should not change much because changes should only be due to patient motion, table motion and/or operator motion. Rapid changes, e.g., indicated by the instantaneous frequency and the phase offset, would indicate a failure in the wireless communication system 300.

Initially, since the input signal has not yet been transmitted over the first or second channel CH1 or CH2, it includes no phase error (as indicated by the error term $e^{j0}$). The first ICM 356 performs a first function, in response to a control signal $\mu$ output by the PID 354 (discussed below), to determine a third variable phase delay ($\Delta\varphi 3(\mu)$) that approximates an inverse of the first variable phase delay ($-\Delta\varphi 1$) of the first channel CH1. In an embodiment, the first function may be a linear function of the control signal ($\mu$). Therefore, the output of the first ICM 356 is first phase adjusted signal $S_1(t) \cdot e^{j\Delta\varphi 3}$. If the first and second channels CH1 and CH2 are symmetric, then the time delay is the same for uplink and downlink: first variable phase delay $\Delta\varphi 1 = \Delta t \cdot \omega_1$ and second variable phase delay $\Delta\varphi 2 = \Delta t \cdot \omega_2$. Thus, third variable phase delay $\Delta\varphi 3$ and fourth variable phase delay $\Delta\varphi 4$ are determined as $\Delta\varphi 3 = -u \cdot \omega_1$ and $\Delta\varphi 4 = -u \cdot \omega_2$, where $\omega_1$ is first frequency $f_1$ and $\omega_2$ is the second frequency $f_2$, discussed below. The phase error will be zero for $\mu = \Delta t$. This is a simple linear approximation based on the assumption of symmetric first and second channels CH1 and CH2 channels. Based on this assumption, the simple linear model holds. For other cases (e.g., where the first and second channels CH1 and CH2 are not symmetric), the linear model is an approximation. By obtaining more information about fading characteristics for uplink and downlink, the inverse channel model may be refined. In a more general case, the inverse channel model is a polynomial.

The first phase adjusted signal $S_1(t) \cdot e^{j\Delta\varphi 3}$ is modulated onto the first RF carrier at the first frequency $f_1$ by the base transceiver 315 to provide the modulated first RF signal. The modulated first RF signal is indicated by $S_1(t) \cdot e^{j(\omega_1 t + \Delta\varphi 3)}$, where $\omega_1 t$ represents the frequency component of the transmitted signal. The base transceiver 315 transmits the first modulated RF signal over the first channel CH1, which has the first variable phase delay ($\Delta\varphi 1$). The first variable phase delay ($\Delta\varphi 1$) is approximately equal to $\Delta t \cdot \omega_1$, where $\Delta t$ is the time delay incurred by the first modulated RF signal passing over the first channel CH1 to the mobile station 320, and $\omega_1$ is the first frequency $f_1$, as mentioned above.

The mobile station 320 receives the delayed first RF signal, indicated by $S_1(t) \cdot e^{j(\omega_1 t + \Delta\varphi 1 + \Delta\varphi 3)}$, recovers the first RF carrier and generates a second RF carrier using the recovered first RF carrier. The recovered first RF carrier has some phase error resulting from the first variable phase delay ($\Delta\varphi 1$) not completely compensated for by the third variable phase delay ($\Delta\varphi 3(\mu)$) determined by the first ICM 356. The mobile transceiver 325 includes a PLL 328, which locks onto the first RF carrier for recovery of the first RF carrier, and performs frequency translation to provide the second frequency $f_2$ of the second RF carrier that is phase locked with the recovered first RF carrier. The PLL 328 may also clean up the recovered first RF carrier and generate the second RF carrier with low jitter, as mentioned above. In an embodiment, the PLL 328 may synchronize the local clock of the mobile device 320 to the system clock using at least one of the recovered first RF carrier and the second RF carrier. The delayed first RF signal, which has been demodulated from the first RF carrier, is modulated onto the second RF carrier at the second frequency $f_2$ by the mobile transceiver 325 to provide the modulated second RF signal, indicated by $S_2(t) \cdot e^{j(\omega_2 t + \Delta\varphi 1 + \Delta\varphi 3)}$, where $\omega_2 t$ frequency component of the transmitted signal. Notably, the delay components $\Delta\varphi 1$ and $\Delta\varphi 3$ are the same as those in the delayed first RF signal.

The mobile transceiver 325 transmits the modulated second RF signal over the second channel CH2, which has the second variable phase delay ($\Delta\varphi 2$), as mentioned above. The second variable phase delay ($\Delta\varphi 2$) is approximately equal to $\Delta t \cdot \omega_2$, where $\Delta t$ is the time delay incurred by the modulated second RF signal passing over the second channel CH2 to the base station 310, and is $\omega_2$ is the second frequency $f_2$. Assuming the base station 310 and the mobile station 320 remain at substantially the same distance from one another during the round trip communication, $\Delta t$ will be the same for both the first channel CH1 and the second channel CH2.

The base station 310 receives the delayed modulated second RF signal, indicated by $S_2(t) \cdot e^{j(\omega_2 t + \Delta\varphi 1 + \Delta\varphi 2 + \Delta\varphi 3)}$. In particular, the base transceiver 315 receives the delayed second RF signal, recovers the second RF carrier. The received second RF carrier has only phase offset with respect to the base station 310 reference, so tracking phase offsets does not require a PLL at the base station 310, although a PLL may be included in the base station 310 for purposes of recovering the second RF carrier, as discussed above with reference to PLL 328, without departing from the scope of the present teachings. The base transceiver 315 downconverts the delayed modulated second RF signal to baseband, removing the frequency component introduced by the second frequency $f_2$, to provide a phase delayed second signal, indicated by $S_2(t) \cdot e^{j(\Delta\varphi 1 + \Delta\varphi 2 + \Delta\varphi 3)}$. The phase delayed second signal is input to the second ICM 358 of the processing unit 350. The second ICM 358 performs a second function, in response to the control signal ($\mu$) output by the PID 354 (discussed below), to determine a fourth variable phase delay ($\Delta\varphi 4(\mu)$) that approximates an inverse of the second variable phase delay ($-\Delta\varphi 2$) of the second channel CH2. In an embodiment, the second function may be a linear function of the control signal ($\mu$). Therefore, the output of the second ICM 358 is second phase adjusted signal $S_2(t) \cdot e^{j(\Delta\varphi 1 + \Delta\varphi 2 + \Delta\varphi 3 + \Delta\varphi 4)}$, which incorporates the effects of the actual phase delays caused by transmission over the first and second channels CH1 and CH2, as well as the compensating phase delays determined by the first and second ICMs 356 and 358. The baseband is a complex I/Q signal, so the phase shift may be accomplished by rotating the complex signal vector, i.e., multiplication with a complex unit vector $\exp(j \cdot \Delta\varphi)$, which works as long as phase errors are less than $+/-\pi$.

The second phase adjusted signal $S_2(t) \cdot e^{j(\Delta\varphi 1 + \Delta\varphi 2 + \Delta\varphi 3 + \Delta\varphi 4)}$ is input to the PED 352, which is configured to determine the cumulative phase error ($\varepsilon$) by comparing the input signal $S_1(t) \cdot e^{j0}$ with the second phase adjusted signal $S_2(t) \cdot e^{j(\Delta\varphi 1 + \Delta\varphi 2 + \Delta\varphi 3 + \Delta\varphi 4)}$. The phase error ($\varepsilon$) is approximately equal to $\Delta\varphi 1 + \Delta\varphi 2 + \Delta\varphi 3 + \Delta\varphi 4$. The PED 352 outputs an error signal indicating the determined phase error ($\varepsilon$) to the PID 354. The PID 354 is configured to generate the control signal ($\mu$) based on the phase error signal received from the PED 352. In an embodiment, the PID 354 generates the control signal ($\mu$) according to Equation (1), as follows, where P is the proportionality factor, I is the integration factor and D is the derivative factor (non-negative coefficients for the proportional, integral and derivative terms, respectively):

$$\mu = P \cdot \varepsilon(t) + I \cdot \int_0^t \varepsilon(\tau) d\tau + D \cdot \frac{d\varepsilon(t)}{dt} \qquad (1)$$

As start values, P may be set to $1/(\omega_1 + \omega_2)$ and I may be set to D, where I and D are each equal to 0, and where $\omega_1$ represents the frequency component of the first RF signal and $\omega_2$ represents the frequency component of the second RF signal. Accordingly, P translates between the measured phase error and the required time delay offset for the channel. The optimum values for P, I and D are found based on the impulse response of the open loop. The values will be optimized to provide a balance between fast response and high stability. The exact values for I and D are also related to the sampling rate of the wireless communication system 400.

The PID 354 applies the control signal ($\mu$) to the first ICM 356, which again determines (updates) the third variable phase delay ($\Delta\varphi 3(\mu)$) using the control signal ($\mu$) pursuant to the first function and outputs another first phase adjusted signal $S_1(t) \cdot e^{j\Delta\varphi 3}$ for transmission. The PID 354 also applies the control signal ($\mu$) to the second ICM 358 in due course, as the next first phase adjusted signal $S_1(t) \cdot e^{j\Delta\varphi 3}$ makes its way through the feedback loop. The second ICM 358 again determines (updates) the fourth variable phase delay ($\Delta\varphi 4(\mu)$) using the control signal ($\mu$) pursuant to the second function and outputs another second phase adjusted signal $S_2(t) \cdot e^{j(\Delta\varphi 1 + \Delta\varphi 2 + \Delta\varphi 3 + \Delta\varphi 4)}$. Of course, the foregoing explanation is simplified for purposes of explanation. In actual operation, the feedback loop is substantially continuous over a period of time (i.e., a clock synchronization period), so the phase adjustments by the first and second ICMs 356 and 358 will not necessarily have a one-to-one correspondence, but rather will occur continuously as respective signals are input.

Due to the feedback loop resulting in determination of the phase error ($\varepsilon$) (which is communicated to the first and second ICM 356 and ICM 358 by the control signal ($\mu$), the first ICM 356 is able to determine a value of the third variable phase delay ($\Delta\varphi 3(\mu)$) that more closely approximates the inverse of the first variable phase delay ($-\Delta\varphi 1$) of the first channel CH1. Likewise, the second ICM 358 is able to determine a value of the fourth variable phase delay ($\Delta\varphi 4(\mu)$) that more closely approximates the inverse of the second variable phase delay ($-\Delta\varphi 2$) of the first channel CH2. Accordingly, after one or more repetitions of the feedback loop, the effects of the first variable phase delay ($\Delta\varphi 1$) and the second variable phase delay ($\Delta\varphi 2$) are reduced and/or substantially eliminated. With no phase delay (e.g., induced by the first and second channels CH1 and CH2, the system clock of the base station 310 (or of the system incorporating the base station, such as the main unit of the MRI system 100, discussed above) and the local clock of the mobile station 320 may be synchronized within an acceptable degree of accuracy, simply by transmitting the clock synchronization signal through the feedback loop shown in FIG. 3. This is accomplished without having to exchange messages with phase information between the base station 310 and the mobile station 320.

Clock synchronization enables the high precision clock synchronization primarily required for sampling clock(s) of the MRI receiver, which needs better than +/−22 ps clock accuracy to sample the MRI signal without introducing significant phase error to the MRI signal. In various implementations, the clock synchronization may continue along with the data communication. Or, the clock synchronization may be periodic or on an "as needed" basis, with data communication occurring between the periods of clock synchronization. For example, the local clock may be sufficiently accurate such that it only needs to be synchronized with the system clock in accordance with the present teachings on start-up and/or once every minute or once every hour, etc.

Figure 4:
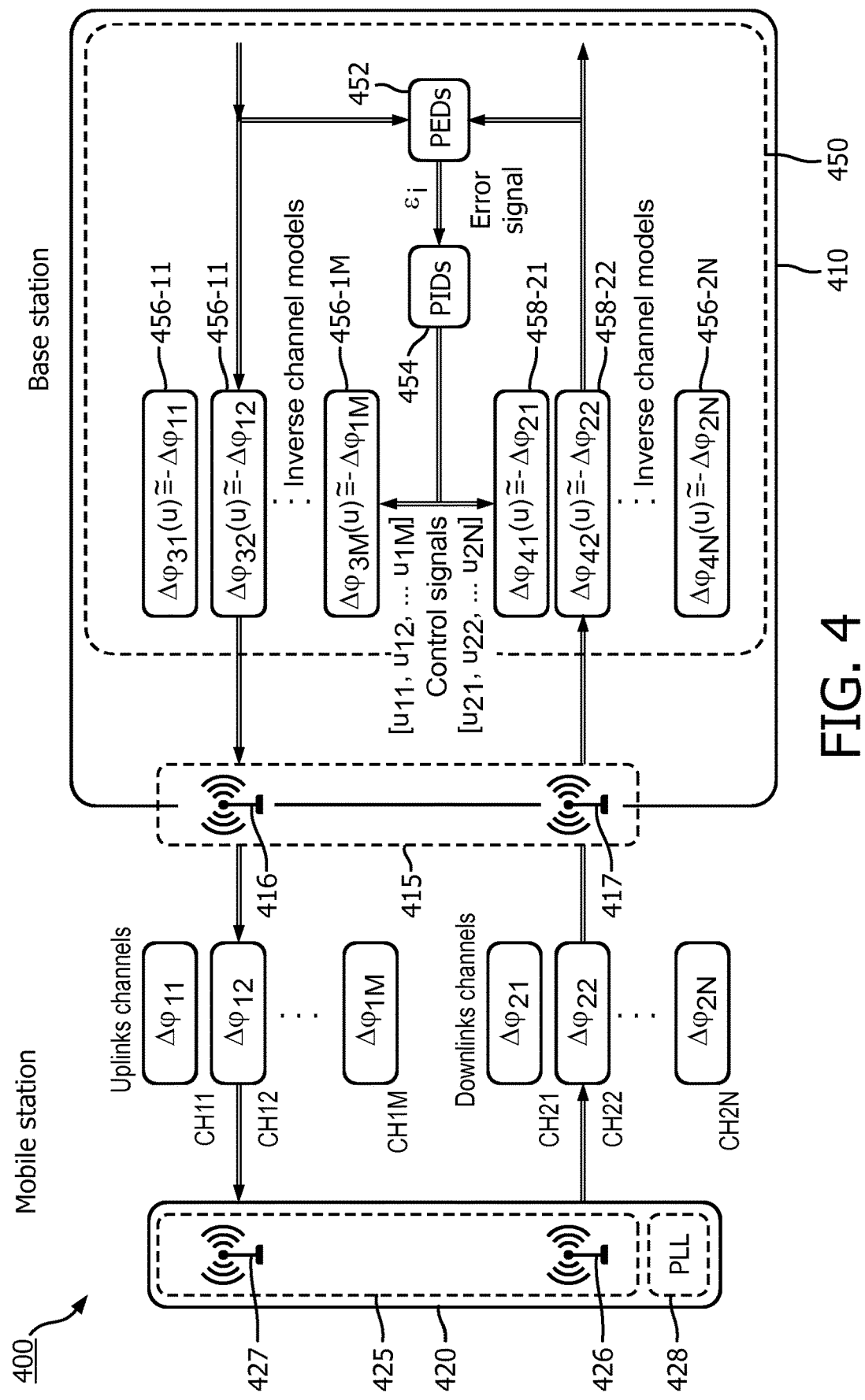
FIG. 4 is a functional block diagram illustrating phase synchronization of clocks in a wireless communication system having multiple uplink and downlink frequencies, according to a representative embodiment.

FIG. 4 is a functional block diagram illustrating phase synchronization of clocks in a wireless communication system having multiple uplink and downlink frequencies, according to a representative embodiment.

Referring to FIG. 4, a wireless communication system 400 includes a base station 410 and a mobile station 420, which are similar to the base station 310 and the mobile station 320 of FIG. 3, except the wireless communication system 400 operates over multiple uplink and downlink frequencies. Thus, the base station 410 and mobile station 420 communicate via multiple wireless first (uplink) channels CH11, CH12 . . . CH1M, where M is a positive integer, and multiple wireless second wireless second (downlink) channels CH21, CH22 . . . CH2N, where N is a positive integer, from the perspective of the base station 410. As shown in FIG. 4, the system (and corresponding process) for synchronizing clocks incorporates multiple feedback loops involving sending and receiving synchronization signals over pairs of first and second channels CH11/CH21, CH12/CH22 . . . CH1M/CH2N to reduce and/or eliminate phase delay introduced by each of these channels, in substantially the same manner described above with reference to FIG. 3. The pairs of first and second channels CH11/CH21, CH12/CH22 . . . CH1M/CH2N enable the use of multiple uplink and downlink frequencies, respectively. The concept is similar to handling ultra-wideband (UWB) signals. Use of multiple carriers over multiple pairs of first and second channels helps deal with multipath interference.

The base station 410 includes a base transceiver 415 with corresponding transmit and receive antennae 416 and 417 for sending and receiving RF signals, respectively, and the mobile station 420 includes a mobile transceiver 425 with corresponding receive and transmit antennae 427 and 426 for receiving and transmitting RF signals, respectively. In alternative configurations, one or both of the base transceiver 415 and the mobile transceiver 425 may be implemented using a separate transmitter and a separate receiver, without departing from the scope of the present teachings. Likewise, it is understood that the signals may be transmitted and received using a single antenna at the base transceiver 415 and/or the mobile transceiver 425, or a pair of antennae at the base transceiver 415 and the mobile transceiver 425 may be supplied for each pair of first and second channels, respectively, without departing from the scope of the present teachings.

As discussed above, the base station 410 also includes a processing unit 450, which includes one or more PEDs 452 and one or more PIDs 454 for determining phase errors ($\varepsilon$) and control signals ($\mu$), respectively, for the pairs of first and second channels. The base station 410 also includes multiple first ICMs 456-11, 456-12 . . . 456-1M (each of which functions the same as the first ICM 356, so the description will not be repeated in detail), and multiple second ICMs 458-21, 458-22 . . . 456-2N (each of which functions substantially the same as the second ICM 358, so the description will not be repeated in detail).

More particularly, the first ICMs 456-11, 456-12, 456-1M receive corresponding input signals, which may be clock synchronization signals for synchronizing a local clock (not shown) of the mobile station 420 with a system clock (e.g., clock generator 108 in FIG. 1) used by the base station 410. The first ICM 456-11 performs a first function on its corresponding input signal in response to a control signal $\mu_{11}$ output by the PID 454, as discussed above with reference to the PID 354, to determine a third variable phase delay ($\Delta\varphi 31(\mu_{11})$) that approximates an inverse of the first variable phase delay ($-\Delta\varphi 11$) of the first channel CH11. Likewise, the first ICM 456-12 performs the first function on its corresponding input signal (e.g., each of the first ICMs 456-11, 456-12, 456-1M deals with one particular carrier and frequency) in response to a control signal $u_{12}$ to determine a third variable phase delay ($\Delta\varphi 32(\mu_{12})$) that approximates an inverse of the first variable phase delay ($-\Delta\varphi 12$) of the first channel CH12, and the first ICM 456-1M performs the first function on its corresponding input signal in response to a control signal pm to determine a third variable phase delay ($\Delta\varphi 3M(\mu_{1M})$) that approximates an inverse of the first variable phase delay ($-\Delta\varphi 1M$) of the first channel CH1M.

The outputs of the first ICMs 456-11, 456-12, 456-1M are first phase adjusted signals, which are modulated onto first RF carriers at different first frequencies by the base transceiver 415 to provide the first RF signals, respectively, as discussed above. The first RF signals are transmitted over the first channels CH11, CH12, CH1M, respectively, which have corresponding first variable phase delays ($\Delta\varphi 11$, $\Delta\varphi 12$, $\Delta\varphi 1M$). Each of the first variable delays is approximately equal to the product of the time delay incurred by the first RF signals passing over respective first channels and the corresponding first frequencies.

The mobile transceiver 425 receives the delayed first RF signals, recovers the first RF carriers (using the PLL 428) and generates corresponding second RF carriers based on the recovered first RF carriers. Generally, one PLL (e.g., PLL 428) is sufficient, although additional PLLs may be incorporated without departing from the scope of the present teachings. The process may also be enhanced for use of multiple carriers which are phase locked to each other. Phase variations between these carriers over time are due to changes in the respective channels. The PLL 428 performs frequency translations to provide different second frequencies of the second RF carriers that are phase locked with the respective recovered first RF carriers. The delayed first RF signals are modulated onto the second RF carriers at the second frequencies by the mobile transceiver 425 to provide the second RF signals. The mobile transceiver 425 transmits the second RF signals over the second channel CH21 (paired with the first channel CH11), the second channel CH22 (paired with the first channel CH12), and the second channel CH2N (paired with the first channel CH1M). The second channels CH21, CH22, CH1N which have corresponding second variable phase delays ($\Delta\varphi21$, $\Delta\varphi22$, $\Delta\varphi2N$). Each of the second variable delays is approximately equal to the product of the time delay incurred by the second RF signals passing over respective second channels and the second frequencies.

The base transceiver 415 receives the delayed second RF signals, recovers the second RF carriers, and downconverts the delayed second RF signals to baseband to provide phase delayed second signals. The phase delayed second signals are input to the second ICMs 458-21, 458-22, 458-2N of the processing unit 450. The second ICM 458-21 performs a second function on its corresponding input signal in response to a control signal $u_{21}$ output by the PID 454, as discussed above with reference to the PID 354, to determine a fourth variable phase delay ($\Delta\varphi41(\mu_{21})$) that approximates an inverse of the second variable phase delay ($-\Delta\varphi21$) of the second channel CH21. Likewise, the second ICM 458-22 performs the second function on its corresponding phase delayed second signal in response to a control signal $u_{22}$ to determine a fourth variable phase delay ($\Delta\varphi42(\mu_{22})$) that approximates an inverse of the second variable phase delay ($-\Delta\varphi22$) of the second channel CH22, and the second ICM 458-1N performs the second function on its corresponding phase delayed second signal in response to a control signal $u_{2N}$ to determine a fourth variable phase delay ($\Delta\varphi4N(\mu_{2N})$) that approximates an inverse of the second variable phase delay ($-\Delta\varphi2N$) of the second channel CH2N.

The second phase adjusted signals are input to the PED 452, which is configured to determine the cumulative phase error ($\varepsilon$) over each of the pairs of first and second channels CH11/CH21, CH12/CH22, CH1M/CH2N by comparing the respective input signals with the corresponding second phase adjusted signals. For example, the phase error ($\varepsilon$) for the first and second channel CH11/CH21 pair is approximately equal to $\Delta\varphi11 + \Delta\varphi22 + \Delta\varphi31 + \Delta\varphi41$. The PED 452 outputs error signals indicating the determined phase errors ($\varepsilon$) to the PID 454. The PID 454 is configured to generate the control signals ($\mu_{11}, \mu_{12}, \mu_{1M}$ and $\mu_{21}, \mu_{22}, \mu_{2N}$) based on the phase error signals received from the PED 452, as discussed above with reference to the PID 354. The PID 454 applies the control signals ($\mu_{11}, \mu_{12}, \mu_{1M}$) to the first ICMs 456-11, 456-12, 456-1M, respectively, which again determine the third variable phase delays ($\Delta\varphi31(\mu_{11})$, $\Delta\varphi32(\mu_{12})$, $\Delta\varphi3M(\mu_{1M})$) pursuant to the first function, as discussed above with reference to ICM 356. The PID 454 also applies the control signals ($\mu_{21}, \mu_{22}, \mu_{2N}$) to the second ICMs 458-21, 458-22, 458-2N, respectively, which again determine the fourth variable phase delays ($\Delta\varphi41(\mu_{21})$, $\Delta\varphi42(\mu_{22})$, $\Delta\varphi4N(\mu_{2N})$) pursuant to the second function, as discussed above with reference to ICM 358, in the next iteration of the respective feedback loops.

Again, the foregoing explanation is simplified for purposes of explanation. In actual operation, each of the feedback loops may be substantially continuous over a period of time (i.e., a clock synchronization period), so the phase adjustments by the first and second will not have a one-to-one correspondence, but rather will likewise occur continuously as respective signals are input. After one or more repetitions of the feedback loops, the first variable phase delays ($\Delta\varphi11, \Delta\varphi12, \Delta\varphi1M$) and the second variable phase delays ($\Delta\varphi21, \Delta\varphi22, \Delta\varphi2N$) are reduced and/or substantially eliminated. With no phase delays, the local clock(s) of the mobile station 420 may be synchronized with the system clock of the base station 410 within an acceptable degree of accuracy, simply by transmitting the clock synchronization signals through the feedback loops.

Figure 5:
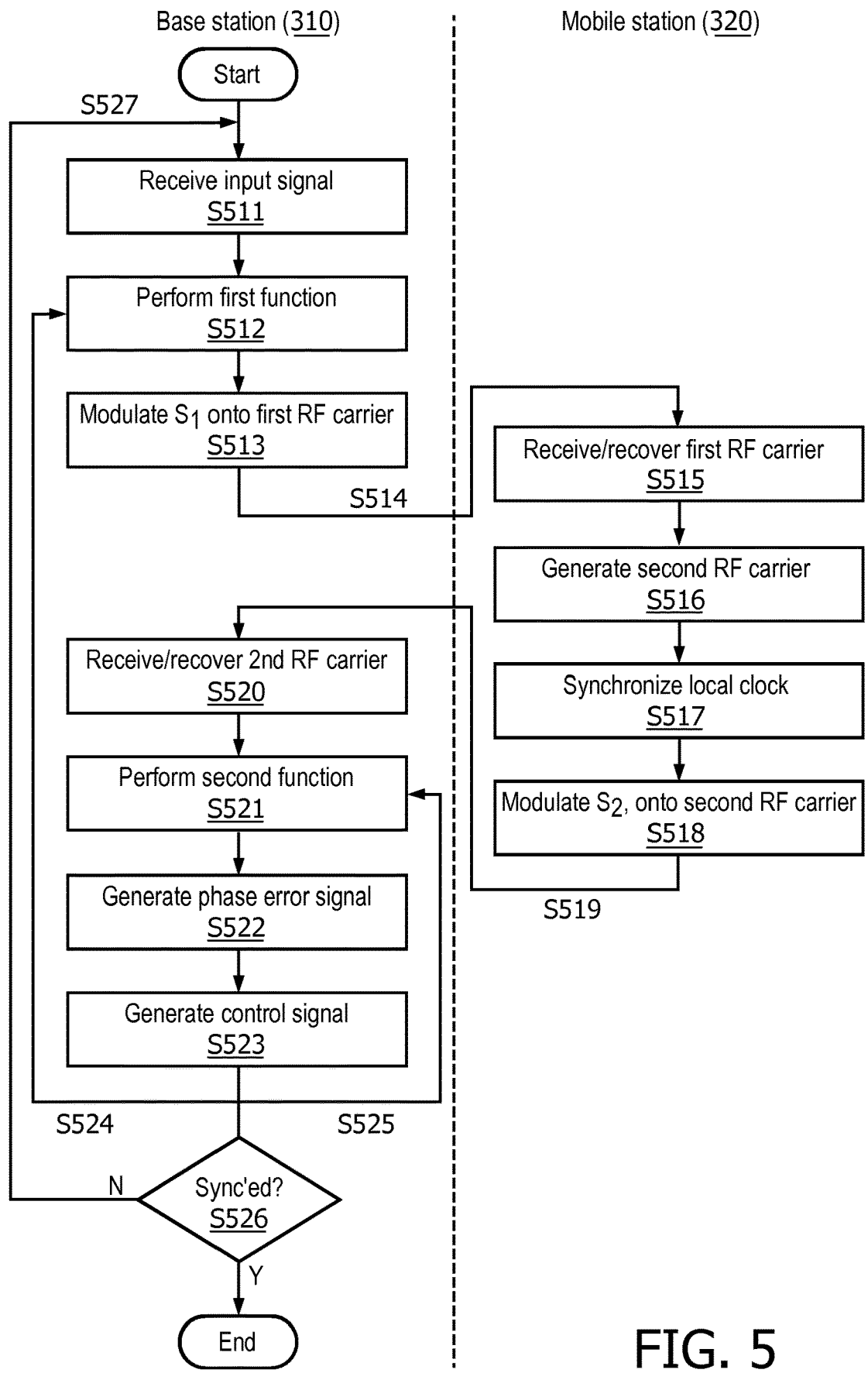
FIG. 5 is a flow diagram illustrating a method of performing phase synchronization of clocks in a wireless communication system, according to a representative embodiment.
Figure 6:
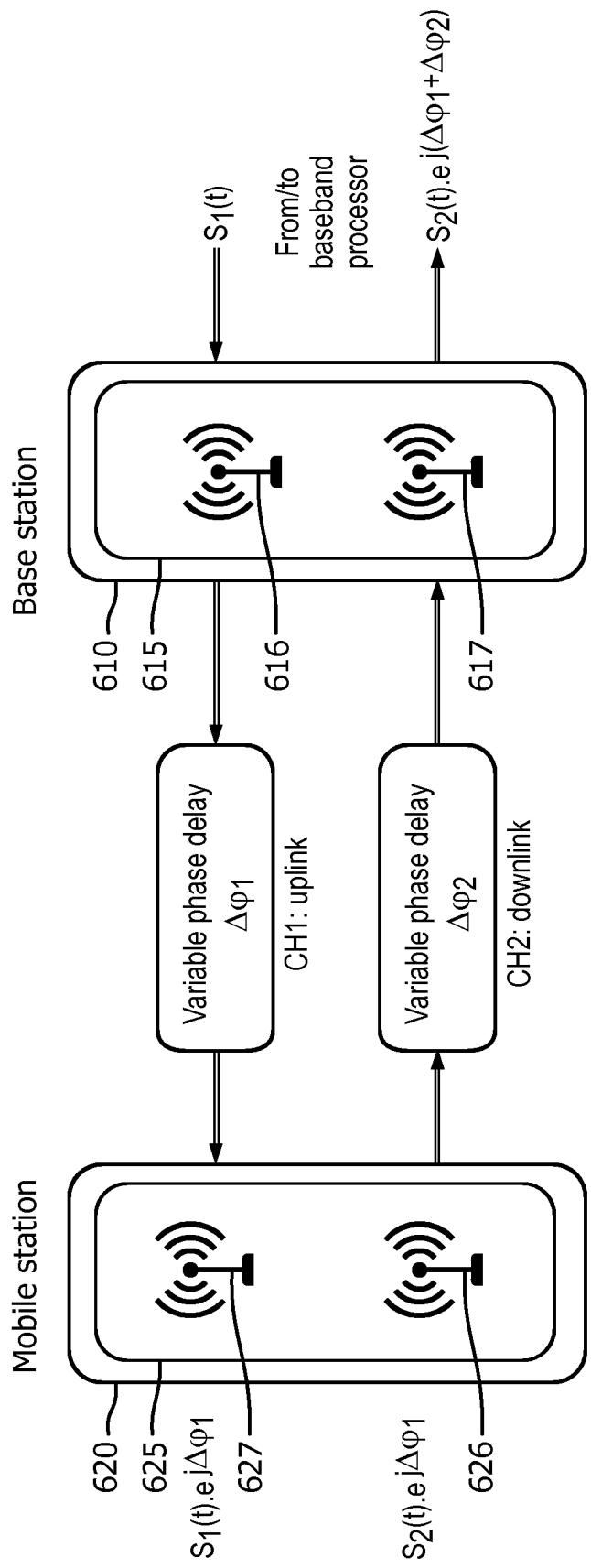
FIG. 6 is a simplified functional block diagram of a base station and a mobile station of a conventional wireless communication system with unsynchronized clocks.

FIG. 5 is a flow diagram illustrating a method of performing for phase synchronization of clocks in a wireless communication system between a base station and a mobile station, according to a representative embodiment. The base station and the mobile station communicate over first and second channels, where the first channel has a first variable phase delay ($\Delta\varphi1$) and the second channel has a second variable phase delay ($\Delta\varphi2$). The method may be implemented, for example, by the wireless communication system 300, discussed above with reference to FIG. 3.

Referring to FIG. 5, an input signal is received by the base station at step S511. For example, the input signal may be a clock synchronization signal for synchronizing a local clock of the mobile station with a system clock of (or used by) the base station. At step S512, a first function is performed on the input signal to adjust the phase of the input signal to provide a first phase adjusted signal. The first function may be performed by a first inverse channel model, which determines a third variable phase delay ($\Delta\varphi3(\mu)$), which approximates an inverse of the first variable phase delay ($-\Delta\varphi1$) of the first channel, in response to a control signal ($\mu$). The control signal ($\mu$) compensates for phase error ($\varepsilon$), discussed below with reference to steps S521 to S522. The first phase adjusted signal is modulated onto a first RF carrier having a first frequency at step S513 to provide a modulated first RF signal.

The modulated first RF signal is transmitted from the base station over the first channel to the mobile station at step S514. As stated above, the first channel has a first variable phase delay ($\Delta\varphi1$), which is substantially equal to the product of the time delay incurred by the first RF signal passing over the first channel to the mobile station (e.g., a function of the physical distance between the base station and the mobile station) and the first frequency of the first RF carrier.

At step S515, the mobile station receives the first RF signal, and recovers the first RF carrier using a PLL to lock onto the first RF carrier. The mobile station generates a second RF carrier having a second frequency at step S516, e.g., by performing frequency translation of the recovered first RF carrier from the first frequency to the second frequency. At step S517, the mobile station synchronizes its local clock with the recovered first RF carrier and/or the generated second RF carrier, effectively recovering the system clock at the mobile station. That is, since phase correction is performed in the base station, both the first and second RF carriers are phase corrected. Therefore, either of the first or second RF carriers may be used for recovering the system clock. For example, the RF second carrier may be a multiple of the local clock (reference clock) of the mobile station. Notably, since the second carrier is already a transmit signal, all that is needed is to output a carrier-only signal on the second channel CH2, where the carrier-only signal is at a frequency that is a multiple of the local clock, and has a baseband frequency/phase offset that is determined from the baseband frequency/phase offset of the received first RF carrier.

A second RF signal (which is essentially the first RF signal delayed by the first variable phase delay introduced by the first channel) is modulated onto the second RF carrier having the second frequency at step S518 to provide a modulated second RF signal. At step S519, the modulated second RF signal is transmitted from the mobile station over a second channel to the base station. As mentioned above, the second channel has a second variable phase delay ($\Delta\varphi2$), which is substantially equal to the product of the time delay incurred by the second RF signal passing over the second channel to the base station and the second frequency of the second RF carrier.

The base station receives the modulated second RF signal, and recovers the second RF carrier at step S520, providing a second phase delayed signal. At step S521, a second function is performed on the second phase delayed signal to adjust the phase of the second phase delayed signal to provide a second phase adjusted signal. The second function may be performed on the second phase delayed signal by a second inverse channel model, using a fourth variable phase delay ($\Delta\varphi4(\mu)$), which approximates an inverse of the second variable phase delay ($-\Delta\varphi2$) of the second channel, in response to the control signal ($\mu$), discussed below.

The base station detects phase error ($\varepsilon$), incurred during the round-trip of the original input signal between the base station and the mobile station (steps S512 through step S521), and generates a phase error signal indicating the detected phase error ($\varepsilon$) at step S522. For example, the phase error ($\varepsilon$) may be detected and the phase error signal may be generated by a phase error detector (PED) in the base station and/or a processing unit in communication with the base station, as discussed above. The PED may detect the phase error ($\varepsilon$) by comparing phases of the second phase adjusted signal and the input signal, for example, to determine a phase difference. The phase error signal is provided to a proportional, integral and derivative controller (PID), which generates the control signal ($\mu$) at step S523 based on the phase error signal generated at step S522. The control signal ($\mu$) is provided to the first inverse channel model of the base station at step S524, indicated by the return to step S512. The control signal ($\mu$) is also provided to the second inverse channel model of the base station at step S525, indicated by the return to step S521.

The number of loops of the feedback loop may be determined a number of ways, without departing from the scope of the present teachings. In the example shown in FIG. 5, it is determined in step S526 whether synchronization of the system clock and the local clock has been achieved. If so, the process ends. If not, the process returns to step 5511 at step S527, completing a loop of the feedback loop for reducing and/or eliminating phase error. The remaining steps 5511 to S526 are then repeated, where in steps S512 and S521, the first and second inverse channel models perform corresponding functions updated by the control signal ($\mu$) generated in step S523. In an embodiment, steps S511 to S526 may be repeated until the phase error ($\varepsilon$) is determined to be zero (or below some predetermined threshold value) at step S522, for example. Alternatively, steps S511 through S526 may simply be repeated a predetermined number of times, which has be shown to adequately remove the phase error (c), e.g., through empirical data.

That is, in each subsequent loop, the first inverse channel model receives the input signal at step S511 (which may be received continuously throughout the clock synchronization process). At step S512, the first function is again performed on the input signal to adjust the phase of the input signal to provide the first phase adjusted signal, this time using the third variable phase delay ($\Delta\varphi3(\mu)$) determined in response to the control signal ($\mu$) received at step S524. Similarly, when the process progresses to step S521, the second function is again performed on the second phase delayed signal to adjust the phase of the second phase delayed signal to provide the second phase adjusted signal, this time using the fourth variable phase delay ($\Delta\varphi4(\mu)$) determined in response to the control signal ($\mu$) received at step S525. At step S526, the process again returns to step S511 when clock synchronization has not yet been achieved, completing another loop of the feedback loop for reducing and/or eliminating phase error.

The elements depicted in FIGS. 1 to 5 may be implemented in various combinations of hardware and software and provide functions which may be combined in a single element or multiple elements. For example, the functions of the various elements shown in FIGS. 1 to 5 may be provided through the use of dedicated hardware as well as hardware capable of executing software in association with appropriate software. When provided by a processor, the functions can be provided by a single dedicated processor, by a single shared processor, or by a plurality of individual processors, some of which can be shared. Moreover, explicit use of the term "processor" or "controller" should not be construed to refer exclusively to hardware capable of executing software, and can implicitly include, without limitation, digital signal processor ("DSP") hardware, read only memory ("ROM") for storing software, random access memory ("RAM"), non volatile storage, etc.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure). Thus, for example, it will be appreciated by those skilled in the art that the block diagrams presented herein represent conceptual views of illustrative system components and/or circuitry embodying the principles of the invention. Similarly, it will be appreciated that any flow charts, flow diagrams and the like represent various processes which may be substantially represented in computer readable storage media and so executed by a computer or processor, whether or not such computer or processor is explicitly shown.

Furthermore, embodiments of the present disclosure can take the form of a non-transitory computer program product accessible from a computer-usable or computer-readable storage medium providing program code for use by or in connection with a computer or any instruction execution system. For the purposes of this description, a computer-usable or computer readable storage medium can be any apparatus that may include, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk read only memory (CD-ROM), compact disk read/write (CD-R/W), Blu-Ray™ and DVD.

While various embodiments are disclosed herein, many variations are possible which remain within the concept and scope of the present teachings. It is therefore to be understood that changes may be made in the particular embodiments of the disclosure disclosed which are within the scope of the embodiments disclosed herein as outlined by the appended claims. Such variations would become clear to one of ordinary skill in the art after inspection of the specification, drawings and claims herein. The present invention therefore is not to be restricted except within the scope of the appended claims.

The invention claimed is:

1. A base station operating with a system clock, the base station comprising:
   a transmitter configured to send a first radio frequency (RF) signal modulated onto a first RF carrier over a first channel to a mobile station, the first RF carrier having a first phase and the first channel having a first variable phase delay ($\Delta\phi_1$), wherein the mobile station receives the first RF signal, recovers the first RF carrier, generates a second RF carrier using the recovered first RF carrier, and synchronizes a local clock using at least one of the recovered first RF carrier and the second RF carrier;
   a receiver configured to receive a second RF signal modulated onto the second RF carrier over a second channel from the mobile station, the second RF carrier having a second phase and the second channel having a second variable phase delay ($\Delta\phi_2$);
   a phase error detector configured to determine a phase error signal, $\epsilon(t)$, based on a difference between the first phase and the second phase; and
   a controller programmed to:
      generate a control signal ($\mu$) based on the phase error signal, $\epsilon(t)$; and
      apply the control signal to a first inverse channel model having a first function ($\Delta\phi_3(\mu)$) that approximates an inverse of the first phase delay ($-\Delta\phi_1$), and to a second inverse channel model having a second function ($\Delta\phi_4(\mu)$) that approximates an inverse of the second phase delay ($-\Delta\phi_2$),
   wherein the approximated inverse of the first phase delay is applied to a subsequent first RF signal sent by the transmitter over the first channel to the mobile station, thereby reducing the first variable phase delay of the first channel and the clock phase error at the mobile station resulting from the first variable phase delay.

2. The base station of claim 1, wherein the approximated inverse of the second phase delay is applied to a subsequent second RF signal received from the mobile station by the receiver over the second channel, thereby reducing the second variable phase delay of the second channel and the phase error signal, $\epsilon(t)$, based on the ratio of the first phase and the second phase.

3. The base station of claim 1, wherein the first inverse channel model comprises a first phase shifter, and the second inverse channel model comprises a second phase shifter.

4. The base station of claim 1, wherein each of the first function and the second function is a linear function of the control signal.

5. The base station of claim 1, wherein the first RF signal comprises a clock synchronization signal including a training sequence.

6. The base station of claim 5, wherein the training sequence comprises Barker code.

7. The base station of claim 1, wherein the first phase is zero and the second phase is comprises accumulated phases of the first and second RF carriers.

8. The base station of claim 1, wherein the controller comprises a proportional, integral and derivative controller (PID).

9. The base station of claim 8, wherein the PID controller generates the control signal ($\mu$) from the phase error signal, $\epsilon(t)$, by determining:

$$\mu = P \cdot \varepsilon(t) + I \cdot \int_0^t \varepsilon(\tau)d\tau + D \cdot \frac{d\varepsilon(t)}{dt},$$

wherein P is a proportionality factor, I is an integration factor and D is a derivative factor, and wherein initially P is set to $1/(\omega_1+\omega_2)$ and I is set to D, where I and D are each equal to 0, where $\omega_1$ represents frequency component of the first RF signal and $\omega_2$ represents frequency component of the second RF signal.

10. The base station of claim 1, wherein the first RF signal comprises a clock synchronization signal including a training sequence.

11. A method of performing clock synchronization between a system clock of a base station and a local clock of a mobile station remote from the base station, the method comprising:
   transmitting a first radio frequency (RF) signal modulated on a first RF carrier over a first channel to the mobile station, the first RF signal having a first phase and the first channel having a first variable phase delay ($\Delta\phi_1$), the mobile station recovering the first RF carrier, generating a second RF carrier using the recovered first RF carrier, and synchronizing the local clock using at least one of the recovered first RF carrier and the second RF carrier;
   receiving a second RF signal modulated on the second RF carrier over a second channel from the mobile station, the second RF signal having a second phase and the second channel having a second variable phase delay ($\Delta\phi_2$);
   determining a phase error signal, $\epsilon(t)$, based on a phase difference between the first phase and the second phase;
   generating a control signal ($\mu$) based on the phase error signal, $\epsilon(t)$;
   approximating an inverse of the first phase delay ($-\Delta\phi_1$) by applying the control signal to a first phase shifter; and
   shifting the first phase of a subsequent first RF signal by the inverse of the first phase delay ($-\Delta\phi_1$) using the first phase shifter, thereby reducing the first variable phase delay and the phase error signal, $\epsilon(t)$, resulting from the first variable phase delay.

12. The method of claim 11, further comprising:
   approximating an inverse of the second phase delay ($-\Delta\phi_2$) by applying the control signal to a second phase shifter; and
   shifting the second phase of a subsequent second RF signal by the inverse of the second phase delay ($-\Delta\phi_2$) using the second phase shifter, thereby reducing the second variable phase delay and the phase error signal, $\epsilon(t)$, resulting from at least the first phase delay and the second phase delay.

13. The method of claim 11, wherein generating the control signal ($\mu$) comprises determining the control signal ($\mu$) from the phase error signal, $\epsilon(t)$, by determining:

$$\mu = P \cdot \varepsilon(t) + I \cdot \int_0^t \varepsilon(\tau)d\tau + D \cdot \frac{d\varepsilon(t)}{dt},$$

wherein P is a proportionality factor, I is an integration factor and D is a derivative factor.

14. A wireless communication system, comprising:
i) a base station operating with a system clock, the base station comprising:
  a transmitter configured to transmit a first radio frequency (RF) signal modulated onto a first RF carrier over a first channel, the first RF carrier having a first phase and the first channel having a first variable phase delay ($\Delta\phi_1$);
  a receiver configured to receive a second RF signal modulated onto a second RF carrier over a second channel, the second RF carrier having a second phase and the second channel having a second variable phase delay ($\Delta\phi_2$);
  a phase error detector configured to determine a phase error signal, $\epsilon(t)$, based on a difference between the first phase and the second phase; and
  a controller; and
ii) a mobile station operating with a local clock, the mobile station comprising:
  a receiver configured to receive the first RF signal modulated onto the first RF carrier over the second channel;
  a phase locked loop (PLL) configured to recover the first RF carrier, to generate the second RF carrier using the recovered first RF carrier, and to synchronize the local clock to the system clock using at least one of the recovered first RF carrier and the second RF carrier; and
  a transmitter configured to transmit the second RF signal modulated onto the second RF carrier over a second channel, the second RF carrier having a second phase and the second channel having a second variable phase delay ($\Delta\phi_2$),
wherein the controller is programmed to:
  generate a control signal ($\mu$) based on the phase error signal, $\epsilon(t)$; and
  apply the control signal to a first inverse channel model having a first function ($\Delta\phi_3(\mu)$) that approximates an inverse of the first phase delay ($-\Delta\phi_1$), and to a second inverse channel model having a second function ($\Delta\phi_4(\mu)$) that approximates an inverse of the second phase delay ($-\Delta\phi_2$), and
wherein the approximated inverse of the first phase delay is applied to a subsequent first RF signal sent by the transmitter over the first channel to the mobile station, thereby reducing the first variable phase delay of the first channel and the clock phase error at the mobile station resulting from the first variable phase delay.

15. The wireless communication system of claim 14, wherein the approximated inverse of the second phase delay is applied to a subsequent second RF signal received from the mobile station by the receiver over the second channel, thereby reducing the second variable phase delay of the second channel and the phase error signal, $\epsilon(t)$, based on the ratio of the first phase and the second phase.

16. A mobile station operating with a local clock, the mobile station comprising:
  a receiver configured to receive a first radio frequency (RF) signal modulated onto a first RF carrier from a base station over a first channel;
  a phase locked loop (PLL) configured to recover the first RF carrier, to generate a second RF carrier using the recovered first RF carrier, and to synchronize the local clock to an associated system clock of an associated magnetic resonance (MR) imaging system using at least one of the recovered first RF carrier and the second RF carrier; and
  a transmitter configured to transmit the second RF signal modulated onto the second RF carrier over the second channel to the base station.

17. The mobile station of claim 16, wherein the mobile station is mounted to an examination table configured to enter a bore of a magnetic resonance imaging system.

18. The mobile station of claim 16, wherein the mobile station is embedded in an examination table configured to enter a bore of a magnetic resonance imaging system.

19. The mobile station of claim 16, wherein the mobile station is positioned above an examination table configured to enter a bore of a magnetic resonance imaging system.

20. The mobile station of claim 16, further comprising at least one MRI receiver to sample MRI data received via at least one MRI coil, wherein the at least one MRI receiver samples the MRI data using the local clock, and
  wherein the first RF carrier and second RF carrier are phase corrected, wherein the first RF carrier has a first carrier frequency and the second RF carrier has a second carrier frequency, wherein at least one of the first carrier frequency and the second carrier frequency is a multiple of a clock frequency of the local clock, and wherein the PLL is configured to synchronize the local clock to the associated system clock of the associated MR imaging system by dividing one of the first carrier frequency and the second RF carrier frequency.

* * * * *